(12) United States Patent
Pan et al.

(10) Patent No.: US 12,515,951 B2
(45) Date of Patent: Jan. 6, 2026

(54) OZONE GENERATOR AND OZONE GENERATING METHOD

(71) Applicant: INDUSTRIAL TECHNOLOGY RESEARCH INSTITUTE, Hsinchu (TW)

(72) Inventors: Kuan-Lun Pan, Taoyuan (TW); Hsin-Hsien Wu, Hsinchu (TW); Keh-Perng Shen, Hsinchu County (TW); Ming-Shou Ho, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 714 days.

(21) Appl. No.: 17/861,078

(22) Filed: Jul. 8, 2022

(65) Prior Publication Data

US 2023/0008171 A1    Jan. 12, 2023

Related U.S. Application Data

(60) Provisional application No. 63/220,337, filed on Jul. 9, 2021.

(30) Foreign Application Priority Data

Jun. 16, 2022    (TW) .................... 111122367

(51) Int. Cl.
    *C01B 13/11*    (2006.01)
(52) U.S. Cl.
    CPC ........ *C01B 13/115* (2013.01); *C01B 2201/22* (2013.01); *C01B 2201/64* (2013.01); *C01B 2201/80* (2013.01)

(58) Field of Classification Search
    CPC ............... C01B 13/115; C01B 2201/22; C01B 2201/64; C01B 2201/80; C01B 13/11;
    (Continued)

(56) References Cited

U.S. PATENT DOCUMENTS 11,111,144 B2    9/2021  Matsuno
2004/0241057 A1  12/2004  Goodley
(Continued)

FOREIGN PATENT DOCUMENTS

CN      1094152     10/1994
CN      2380555 Y   5/2000
(Continued)

OTHER PUBLICATIONS

Taiwan Office Action dated Apr. 26, 2023 as received in application No. 111122367.
(Continued)

*Primary Examiner* — Xiuyu Tai
(74) *Attorney, Agent, or Firm* — Maschoff Brennan (57) ABSTRACT

An ozone generator and an ozone generating method, where the ozone generator includes a dielectric substrate, a first electrode disposed on a first surface of the dielectric substrate, and a second electrode disposed on the dielectric substrate and corresponding to the first electrode. The first electrode comprises a plurality of first finger portions and a plurality of superficial structures integrally formed on the plurality of first finger portions.

16 Claims, 8 Drawing Sheets

(58) Field of Classification Search
CPC ............ C01B 2201/90; C01B 2201/32; C01B 2201/34; C01B 2201/82; C01B 2201/12; C01B 2201/70; C01B 2201/60; B01J 19/08; B01J 19/088; B01J 35/39; H01T 19/00; A61N 1/44; A61C 19/06; H05H 1/2406; H05H 1/245; H05H 2245/34; H05H 1/246; H05H 1/2443; A61B 18/042; A61B 90/50; A61B 2018/0047; A61B 2018/00452; A61B 2018/00744
See application file for complete search history.

(56) References Cited

U.S. PATENT DOCUMENTS

| | | | |
|---|---|---|---|
| 2006/0049738 | A1 | 3/2006 | Tabata et al. |
| 2012/0308440 | A1 | 12/2012 | Owens |
| 2014/0119991 | A1 | 5/2014 | Snowball |
| 2021/0213298 | A1* | 7/2021 | Takata .................. B01J 19/088 |

FOREIGN PATENT DOCUMENTS

| | | | |
|---|---|---|---|
| CN | 2521868 | Y | 11/2002 |
| CN | 1774394 | A | 5/2006 |
| CN | 106082134 | B | 11/2016 |
| CN | 108291503 | A | 7/2018 |
| CN | 108712997 | A | 10/2018 |
| CN | 108712998 | A | 10/2018 |
| CN | 108778989 | A | 11/2018 |
| CN | 109415206 | A | 3/2019 |
| EP | 3 470 367 | * | 6/2017 |
| JP | H1025105 | | 1/1998 |
| JP | 2001-220112 | A | 8/2001 |
| JP | 2001220111 | A | 8/2001 |
| JP | 06584995 | B2 | 10/2019 |

OTHER PUBLICATIONS

Zhang et al. "A novel approach to the pacemaker infection with non-thermal atmospheric pressure plasma" 2017.

Pekáreka et al. "Comparative study of TiO2 and ZnO photocatalysts for the enhancement of ozone generation by surface dielectric barrier discharge in air" 2015.

"Effect of TiO2 on Various Regions of Active Electrode on Surface Dielectric Barrier Discharge in Air" Jun. 17, 2016.

Pekárek et al. "Enhancement of Energy for Ozone Production via Packed-Bed Reactors" 2016.

Rezaei et al. "Investigation of antibacterial and wettability behaviours of plasma-modified PMMA films for application in ophthalmology" 2014.

Wei et al. "Ozone generation enhanced by silica catalyst in oxygen-fed dielectric barrier dishcarge" Mar. 2020.

Malik et al. "Ozone Synthesis Using Shielded Sliding Discharge: Effect of Oxygen Content and Positive versus Negative Streamer Mode" 2014.

Feng Ma, et al., "A Research of Modern Electrostatic Science and Technology," (Aug. 31, 1999).

TW Office Action dated Sep. 1, 2023 as received in Application No. 111122367.

CN Office Action dated Sep. 7, 2023 as received in Application No. 202210776338.0.

* cited by examiner

OZONE GENERATOR AND OZONE GENERATING METHOD

CROSS-REFERENCE TO RELATED APPLICATIONS

This application claims the priority benefits of U.S. provisional application Ser. No. 63/220,337, filed on Jul. 9, 2021 and priority under 35 U.S.C. § 119(a) on Patent Application No(s). 111122367 filed in Taiwan (R.O.C.) on Jun. 16, 2022. The entirety of each of the above-mentioned patent application is hereby incorporated by reference herein.

TECHNICAL FIELD

The disclosure relates to an ozone generation technique, more particularly relates to an ozone generator and an ozone generating method.

BACKGROUND

It is known that ozone ($O_3$) can be widely used in various fields, such as treatments of waste water and air pollution, disinfection of medical and food industries, high-tech manufacturing processes, agricultural, fishery, and aquatic products. Also, the ozone not only has an oxidizing power greater than that of $H_2O_2$, $ClO_2$, and $HOCl$, but also has a shorter half-life (about 30 minutes under room temperature and atmosphere pressure), and the ozone will be reduced to oxygen ($O_2$) when contacting pollutants (or microorganisms), so there is no risk of secondary pollution.

Conventionally, ozone generators with tube-shaped reactors by feeding oxygen gas are utilized for ozone generation, and it needs to apply high voltage to the electrode for reaching breakdown voltage for producing plasma and ozone generation. However, such an ozone generation technique is power-consuming and is low in the ozone generation efficiency (g/kWh), which makes it unable to be widely applied in small and medium-sized enterprises and not cost-effective for air pollution and waste water treatments.

SUMMARY

Accordingly, one aspect of the disclosure is to provide an ozone generator and an ozone generating method which enable a low power consumption and high energy efficiency in ozone generation.

One embodiment of the disclosure provides an ozone generator includes a dielectric substrate, a first electrode disposed on a first surface of the dielectric substrate, and a second electrode disposed on the dielectric substrate and corresponding to the first electrode. The first electrode comprises a plurality of first finger portions and a plurality of superficial structures integrally formed on the plurality of first finger portions.

One embodiment of the disclosure provides an ozone generating method including: providing an ozone generator, wherein a first electrode of the ozone generator is disposed on a first surface of a dielectric substrate and comprises a plurality of first finger portions and a plurality of superficial structures integrally formed on the plurality of first finger portions; providing oxygen gas into a chamber body accommodating the ozone generator; and providing voltage to the first electrode and grounding a second electrode disposed on the dielectric substrate and corresponding to the first electrode so as to generate ozone using surface discharge.

According to the ozone generator and the ozone generating method as discussed in the above embodiments of the disclosure, the first electrode on the dielectric substrate enables surface discharge, and the superficial structures on the first electrode are able to induce discharge to improve the interaction with the catalyst, thus the plasma intensity near the first electrode is higher. This arrangement makes the ozone generator to be able to generate ozone under a relatively low operating voltage and lower power consumption while being able to improve the ozone generation efficiency.

Also, the superficial structure increases the surface area for improving heat dissipation and therefore can increase the temperature of the first electrode so as to decrease the impact of high temperature on the ozone yield and ozone generation efficiency.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities. The phrase "in fluid communication with" may be used to mean that fluid (liquid and/or gas) is allowed to flow between two spaces, areas, slots, holes, channels and/or openings.

Figure 1:
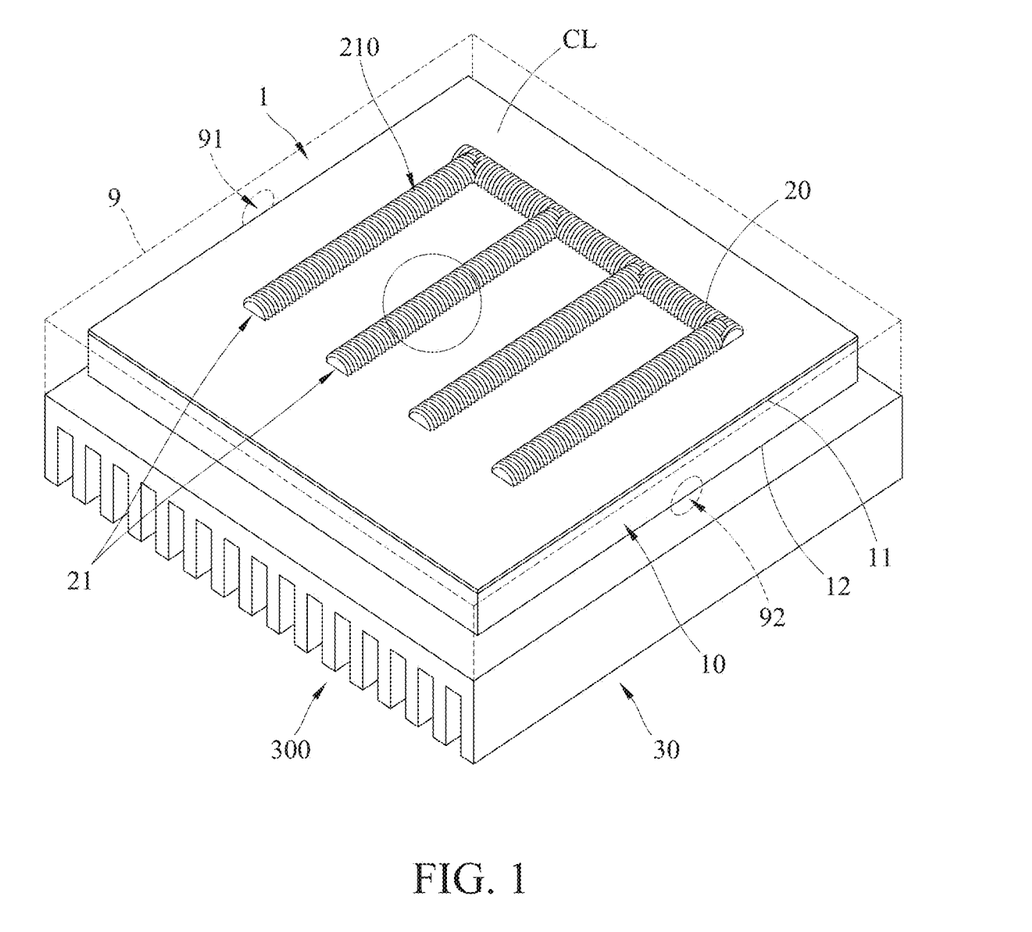
FIG. 1 is a perspective view of an ozone generator according to one embodiment of the disclosure.

Firstly, referring to FIG. 1, one embodiment of the disclosure provides an ozone generator 1 which is able to generate ozone ($O_3$) on surface of a dielectric substrate using, for example, surface discharge. As shown, the ozone generator 1 is disposed in a chamber body 9 and includes a dielectric substrate 10, a first electrode 20, a second electrode 30, and a catalyst layer CL.

The chamber body 9 may be a hollow structure made of suitable material, such as acrylic or polytetrafluoroethylene. The chamber body 9 is able to be connected to an external oxygen source (not shown) for receiving oxygen ($O_2$) required by the ozone production. In specific, the chamber body 9 has a gas inlet 91 and a gas outlet 92 respectively located at different sides (e.g., two opposite sides) of the chamber body 9, where the gas inlet 91 is configured to be in direct or indirect fluid communication with an external oxygen source (not shown) so as to allow oxygen to enter into the chamber body 9 for having required reactions, and the gas outlet 92 is configured to discharge the reacted gas out of the chamber body 9.

The dielectric substrate 10 is made of any suitable dielectric material, such as quartz, boron nitride, or ceramics. The dielectric substrate 10 has a first surface 11 configured to support the catalyst layer CL and the first electrode 20.

The catalyst layer CL is coated or provided on the first surface 11 of the dielectric substrate 10 by any suitable manner. In one embodiment, the catalyst layer CL fully covers the first surface 11 of the dielectric substrate 10. In another embodiment, the catalyst layer CL may only cover part of the first surface 11 of the dielectric substrate 10.

The catalyst layer CL is able to increase the rate of chemical reaction of ozone generation. Specifically, the catalyst layer CL may have a chemical compound made of titanium and oxygen, such as $TiO_2$, $Ti_2O_3$ or $Ti_3O_5$ (may be called "conventional titanium catalyst" hereinafter) or Black $TiO_2$ (may be called "black titanium dioxide" hereinafter). The catalyst layer CL used during the ozone generation may cause a heterogeneous catalysis and/or a photo catalysis reaction. The heterogeneous catalysis reaction may be an L-H (Langmuir-Hinshelwood) reaction or an E-R (Eley-Rideal) reaction which may cause "generation of active oxygen (O) using plasma" and "active oxygen absorbed on the surface of the catalyst layer CL and then converted into ozone" or "active oxygen has interactions at the surface of the catalyst layer CL to generate ozone". The photo catalysis reaction may cause "plasma-generated active species, such as $O^-$, $O_3^-$, $O_2^-$, are generated on the surface of the catalyst layer CL" and "ozone generated by the interfacial reaction on the catalyst layer CL".

The preparation of black titanium dioxide may at least involve the following steps: (1) heating a conventional titanium catalyst to a temperature of about 300-500° C. with high purity nitrogen gas ($N_2$) for about 0.5-2 hours and thereby chemically modifying it into an substance with darker color (may be called "black titanium dioxide); (2) pounding the black titanium dioxide into powder; (3) mixing the black titanium dioxide with a proper proportion of titanium isopropoxide and then coated on the first surface 11 of the dielectric substrate 10; (4) calcinating the dielectric substrate 10 that coated with the mixture of the titanium isopropoxide and the black titanium dioxide to a temperature of about 300° C. with high purity nitrogen gas, and then annealed to obtain a catalyst layer CL made of black titanium dioxide on the dielectric substrate 10.

Figure 2:
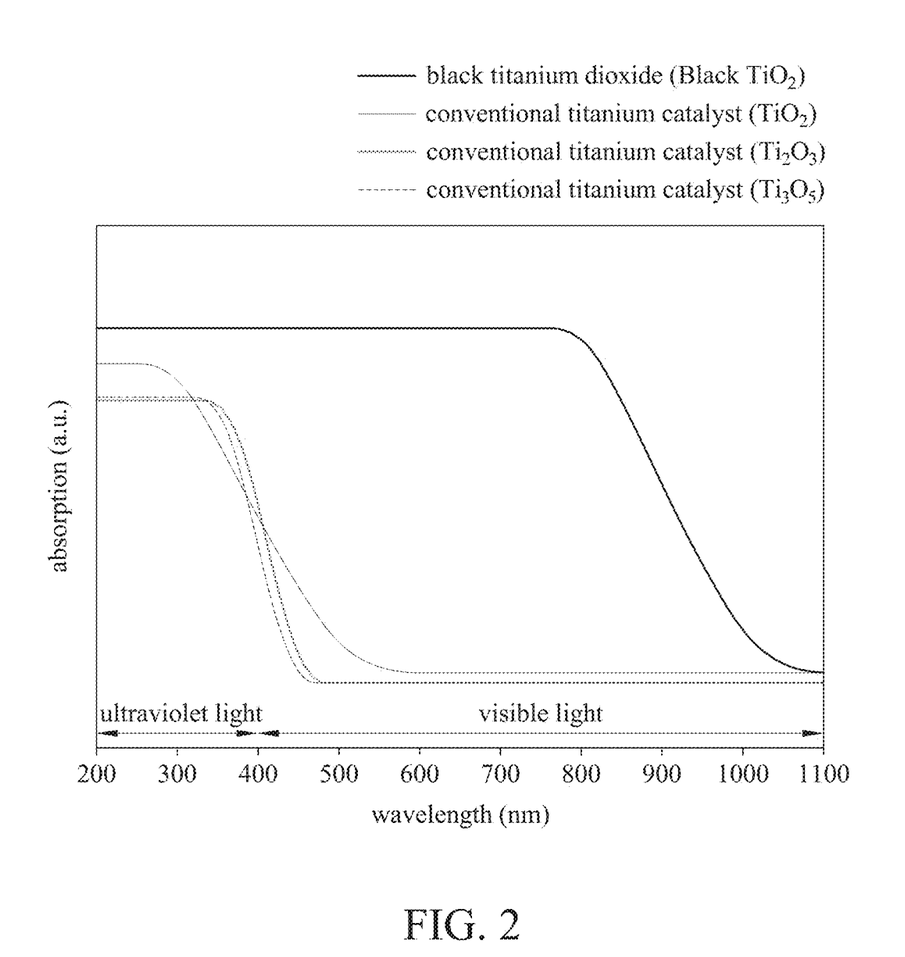
FIG. 2 shows absorption spectra of the conventional titanium catalyst (e.g., $TiO_2$, $Ti_2O_3$ and $Ti_3O_5$) and the black titanium dioxide (Black $TiO_2$)

Please refer to FIG. 2, which shows absorption spectra of the conventional titanium catalyst (e.g., $TiO_2$, $Ti_2O_3$ and $Ti_3O_5$) and the black titanium dioxide (Black $TiO_2$), as shown, the black titanium dioxide has high absorption unit (a.u.) in a wide wavelength range (e.g., around 200 nanometers (nm) to 1000 nm) which covers ultraviolet light and visible light wavelengths. In contrast, the absorption of the conventional titanium catalyst only ranges from 200 nm to 600 nm and does not cover visible light wavelength. That is, the black titanium dioxide has an absorption peak in a wider wavelength range (i.e., from about 200 nm to 1000 nm), but the conventional titanium catalyst has an absorption peak only in a narrow wavelength range (i.e., from 200 nm to 600 nm).

According to Nature Journal, Scientific Reports, 9 (1), 2019, the wavelength of light emitted by oxygen plasma required for producing ozone mainly range between 777 nm and 844 nm. Thus, the catalyst layer CL having the black titanium dioxide that has an absorption peak in the visible light wavelengths is beneficial for the oxygen plasma to induce required photo catalysis reaction and thereby improving ozone yield.

Figure 3:
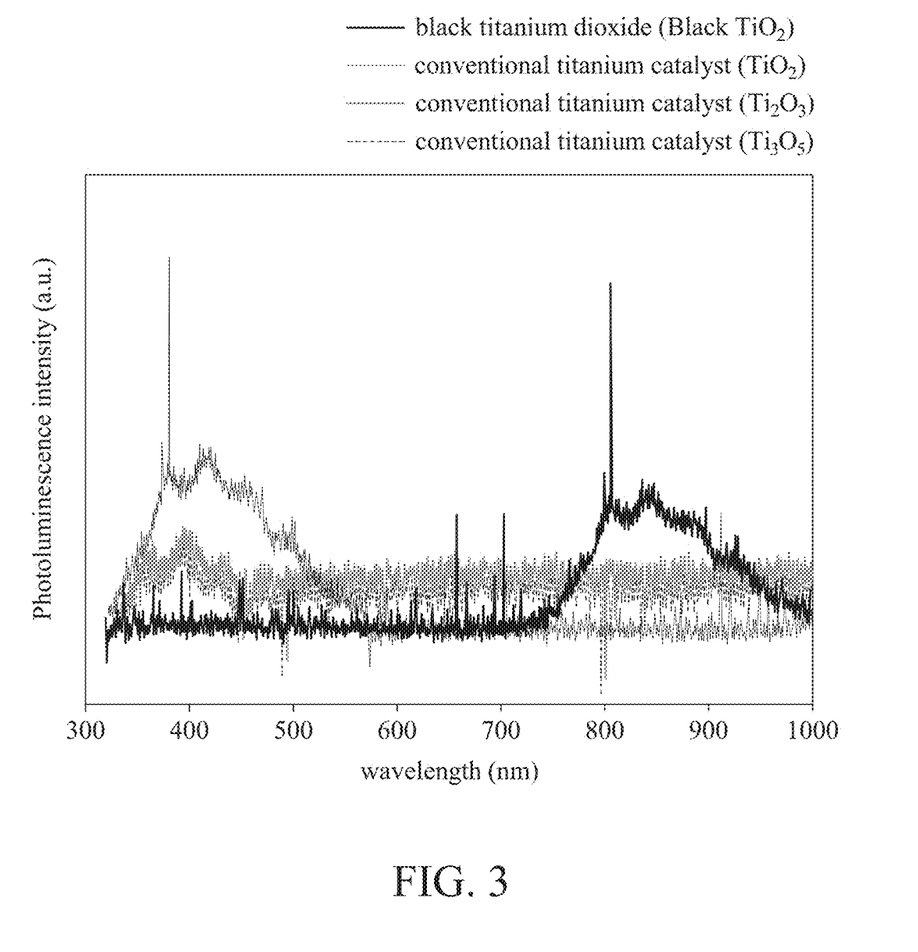
FIG. 3 shows photoluminescence spectroscopy of the conventional titanium catalyst (e.g., $TiO_2$, $Ti_2O_3$ and $Ti_3O_5$) and the black titanium dioxide (Black $TiO_2$).

Please refer to FIG. 3, which shows photoluminescence spectroscopy of the conventional titanium catalyst (e.g., $TiO_2$, $Ti_2O_3$ and $Ti_3O_5$) and the black titanium dioxide (Black $TiO_2$). An empirical formula for energy gap (also called "band gap) is: 1240/λ, where λ may be the middle value of the peak in FIG. 3. For example, as shown, λ of the black titanium dioxide may approximately be 850 nm, thus its energy gap may, approximately, be 1240/850=1.45 eV; λ of the other conventional titanium catalysts may approximately be 400 nm, thus their energy gaps may, approximately, be 1240/400 nm=3.0 eV. In comparison, the energy gap of the black titanium dioxide is lower than that of the conventional titanium catalysts. It is known that the lower energy gap is more beneficial for photo catalysis reaction; that is, using the black titanium dioxide can achieve a better photo catalysis reaction than using the conventional titanium catalyst.

Then, please refer to FIG. 1, the first electrode 20 may be made of any suitable electrically conductive material. The first electrode 20 is disposed on the first surface 11 by any suitable manner. The first electrode 20 is in contact with the catalyst layer CL. In some embodiments, the first electrode 20 includes a plurality of first finger portions 21. The first finger portions 21 are spaced apart by each other by a suitable distance. It is noted that the number, width, length, and height of the first finger portions 21 and the gaps between the first finger portions 21 may be modified as required and are not intended to limit the disclosure. Optionally, each of the first finger portions 21 has a cross-section in polygonal shape or semi-circular shape.

The dielectric substrate 10 further has a second surface 12 located opposite to the first surface 11. Optionally, a conductive layer may be coated on the second surface 12 and served as a ground layer. For example, in this embodiment, the second electrode 30 is connected to the second surface 12 using any suitable manner, and the second electrode 30 can be served as a ground layer. Specifically, the dielectric substrate 10 is disposed on the second electrode 30 using any suitable manner, such that the second electrode 30 is able to support the dielectric substrate 10 and the first electrode 20 and the catalyst layer CL on the dielectric substrate 10. The chamber body 9 is fixed to the second electrode 30 using any suitable means (not shown, such as screws, bolts, or adhesive). The chamber body 9 is able to cover the dielectric substrate 10 and the first electrode 20 and the catalyst layer CL on the dielectric substrate 10, such that the chamber body 9 and the second electrode 30 together enclose the dielectric substrate 10 and the first electrode 20 and the catalyst layer CL on the dielectric substrate 10 therein.

In more detail, the second electrode 30 may include one or more fin structures 300. As shown, the fin structures 300 extend outwards from a surface of the second electrode 30 located opposite to the first electrode 20 and are spaced apart from each other by a suitable spacing. In some embodiments, the second electrode 30 may be an aluminum heat sink having a length and a width both of 165 millimeters (mm), and fin structures 300 have a height of 45 mm. As such, the second electrode 30 is also able to increase the surface area for convection heat transfer and therefore is beneficial to cool the ozone generator 1, thereby decreasing the impact of high temperature on the ozone generation. Also, the first electrode 20 and the second electrode 30 are respectively arranged at two opposite surfaces of the dielectric substrate 10, such an arrangement is beneficial to reduce the impact of electrons in plasma and therefore benefits to prolong the service life of the dielectric substrate 10.

Figure 4:
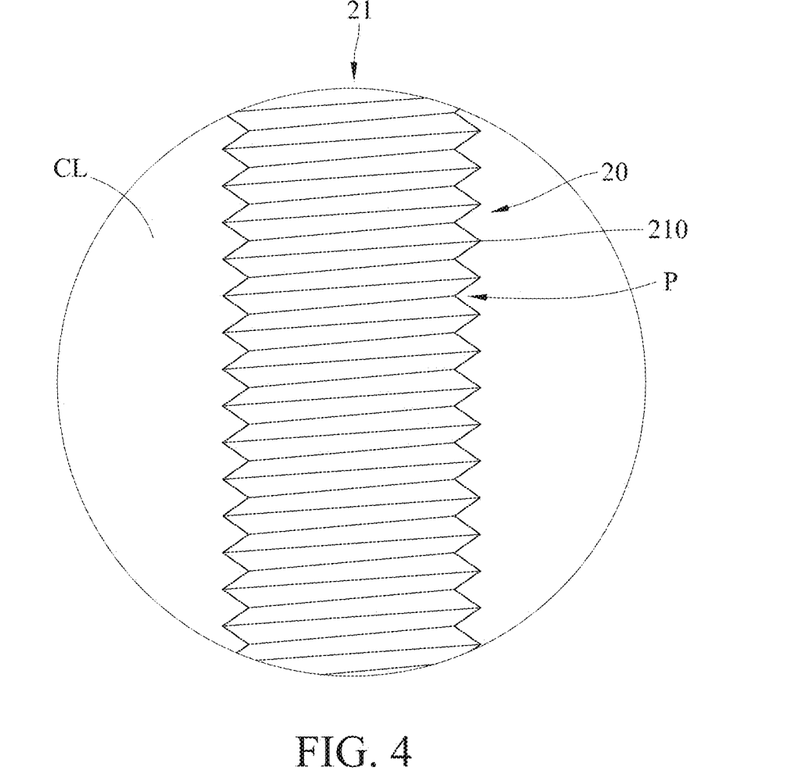
FIG. 4 is a partially enlarged view of the ozone generator in FIG. 1.
Figure 5:
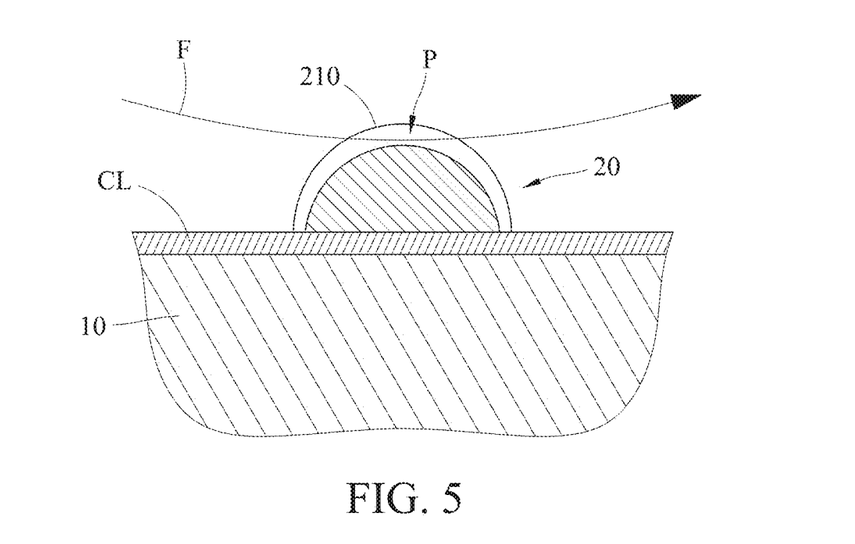
FIG. 5 is a partially enlarged cross-sectional view of the ozone generator in FIG. 1.

Please refer to FIG. 1 and further refer to FIGS. 4-5 to see enlarged views of the first finger portions 21. As shown, at least part of the catalyst layer CL exists between the first finger portions 21 of the first electrode 20 and the dielectric substrate 10. In addition, the first electrode 20 further includes a plurality of superficial structures 210 arranged on the surfaces of the first finger portions 21, the superficial structures 210 are in contact with the catalyst layer CL. In this or other embodiments, the superficial structures 210 are integrally formed with the first finger portions 21. Specifically, the superficial structures 210 integrally formed with the first finger portions 21 and protrude outwards from the first finger portions 21. For example, the superficial structures 210 may be threaded structures or a spiral structure formed on the first finger portions 21. In some other embodiments, the threaded structures formed of the superficial structures 210 may have a thread pitch ranging approximately from 1.2 mm to 3.7 mm. In the embodiments that the superficial structures 210 form threaded structures or a spiral structure, the superficial structures 210 form or define a plurality of air channels P thereamong (as shown in FIG. 5), the air channels P allows air (e.g., F shown in FIG. 5) to flow across first finger portions 21. Also, the superficial structures 210 are able to increase surface area for heat transfer with airflow and thereby improving heat dissipation of the first electrode 20.

Figure 6:
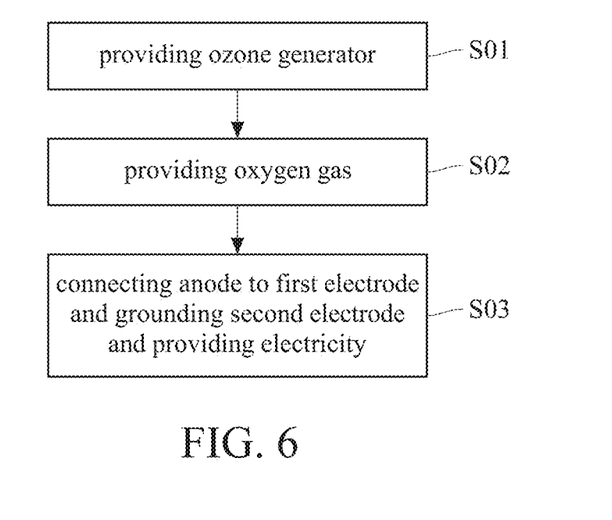
FIG. 6 is a flow chart of an ozone generating method that using the ozone generator shown in FIG. 1.

In such an arrangement, please refer to FIG. 6, which shows a flow chart of an ozone generating method that using the ozone generator 1. The step S01 is to provide the ozone generator 1, where the ozone generator 1 may selectively adopt conventional titanium catalyst or black titanium dioxide as its catalyst layer CL as required. Then, the step S02 is to provide oxygen gas into the chamber 9 which accommodates the ozone generator 1. Then, the step S03 is to connect anode to the first electrode 20, to ground the second electrode 30, and provide electricity the first electrode 20, thereby generating ozone using surface discharge. Specifically, the first electrode 20 may be connected to an external power source (not shown) that provides 60 W AC current in a wired manner. As the current flows into the first electrode 20, plasma is generated at the peripheral of the first electrode 20, and the tips of the superficial structures 210 on the first electrode 20 of the first finger portion 21 will induce point discharges/plasma effect to improve the intensity of the plasma. Meanwhile, since the tips of the superficial structures 210 are in contact with the catalyst layer CL, the catalyst layer CL is able to increase the chemical reaction at the tips of the superficial structures 210 and thereby further improving the plasma intensity and the intensity of the generated electrons. Thus, the ozone yield (g/h) and ozone generation efficiency (g/kWh) are both increased and thereby enabling a low power consumption and high energy efficiency ozone generation.

A simulation experiment of the ozone generator 1 is given below. In this experiment, the dielectric substrate 10 is a plate made of quartz or boron nitride and has a thickness of about 0.8 to 1 centimeters (cm) and a length and width both of 15 cm, the catalyst layer CL coated on the dielectric substrate 10 is made of black titanium dioxide and has a thickness of about 100 nm, an oxygen gas in purity of about 99% is injected into the chamber body 9 at a rate of about 4 to 6 L/min, the oxygen gas averagely stay about 1 to 1.5 seconds in the chamber body 9, a 60 W operating voltage with a voltage range of 3 kV to 5 kV and an operating frequency of 10 kHz to 25 kHz is provided to the first electrode 20, and the first electrode 20 having the superficial structures 210 cooperate with the catalyst layer CL can make the ozone generation efficiency reach about 128 to 140 g/kWh.

Figure 7:
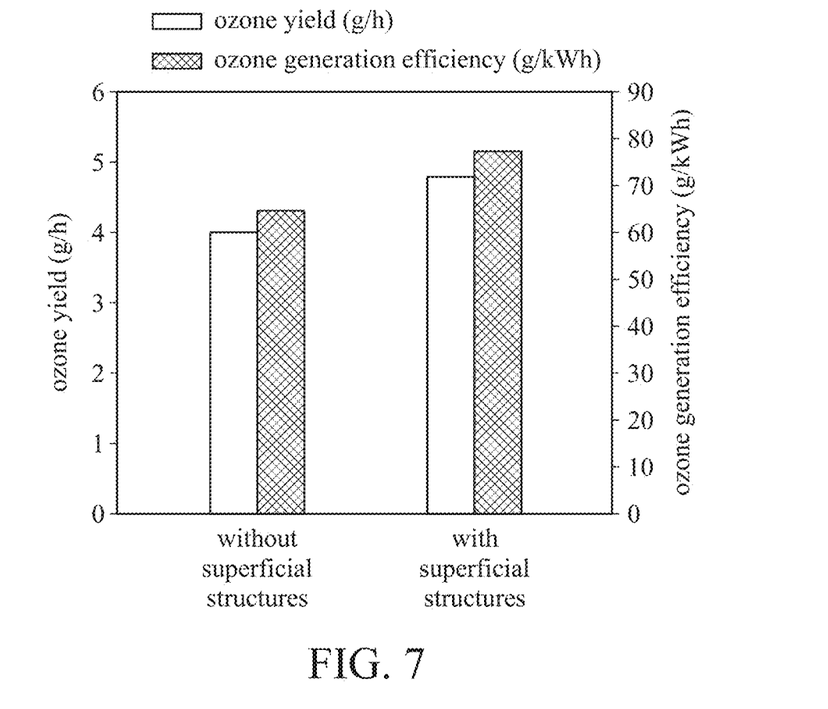
FIG. 7 shows ozone yield and ozone generation efficiency comparisons of the ozone generator with superficial structures and an ozone generator without superficial structures.

Then, please see FIG. 7, which shows ozone yield and ozone generation efficiency comparisons of the ozone generator 1 with superficial structures 20 and an ozone generator without superficial structures 20 under the same conditions (e.g., 60 W operating voltage), as shown, the ozone yield and the ozone generation efficiency that the ozone generator 1 having the superficial structures 210 on its first electrodes 20 are significantly higher than one without the superficial structures. In specific, the ozone generator 1 having the superficial structures 210 approximately have a 20% increase in the superficial structures 210, the ozone yield and the ozone generation efficiency compared to one without the superficial structures 210. That is, the arrangement of the superficial structures 210 is beneficial to make the ozone generator 1 achieve low power consumption and high energy efficiency in ozone generation.

Figure 8:
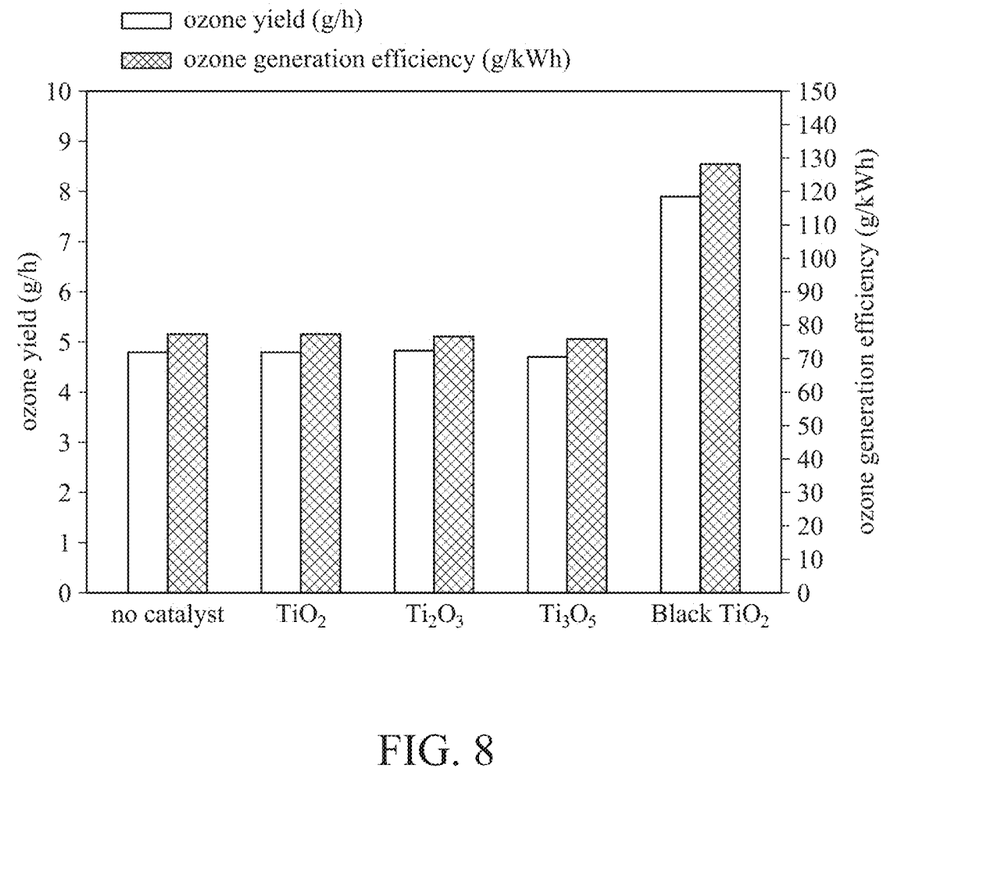
FIG. 8 shows ozone yield and ozone generation efficiency comparisons of the ozone generator adopting conventional titanium catalyst, the ozone generator adopting black titanium dioxide, and the ozone generator without any catalyst layer.

In addition, please refer to FIG. 8, which shows ozone yield and ozone generation efficiency comparisons of the ozone generator adopting conventional titanium catalyst, the ozone generator adopting black titanium dioxide, and the ozone generator without any catalyst layer, where the comparisons are performed under the same conditions (a voltage of about 4 kV, a frequency of about 14.5 kHz, a flow rate of oxygen gas of about 6 L/min, the residence time of oxygen gas in chamber body 9 is about 1 second). As shown, the catalyst layer made of black titanium dioxide can make the ozone generator achieve a significantly higher ozone yield and ozone generation efficiency compared to others.

It is noted that the ozone generator provided by the disclosure is suitable for being operated under relatively low operating voltage (e.g., 3 to 5 kV) and relatively high operating frequency (e.g., 10 to 25 kHz). When the operating frequency is relatively low (e.g., 0.05 to 0.06 kHz), arc discharges are easily generated and thus affecting the generation of ozone. In addition, compared to the cases that the dielectric substrate 10 is made of $Al_2O_3$, AlN, or $Si_3N_4$, the dielectric substrate 10 made of quartz or boron nitride is less likely to induce arc discharges.

Optionally, the first finger portions 21 of the first electrode 20 are arranged along a line substantially perpendicular to a line that the gas inlet 91 and the gas outlet 92 of the chamber body 9 are arranged along. In other words, a line (not shown) passing the gas inlet 91 and the gas outlet 92 passes through all of the first finger portions 21. That is, the first finger portions 21 are arranged between the gas inlet 91 and the gas outlet 92. This arrangement is beneficial for oxygen gas flow to pass through all of the first finger portion 21 and thereby improving the ozone generation efficiency.

It is also noted that the previous ozone generators are exemplary embodiments of the disclosure and not intended to limit the disclosure.

The following provides ozone generators of other embodiments which are capable of achieving the effect the same as shown in the previous embodiments, but for the purpose of simplicity, only the main differences between the following embodiments and the previous embodiments will be described in detail, and the same or similar parts can be comprehended with reference to the corresponding paragraphs and thus will not be repeatedly described hereinafter. It is also noted that the same reference number denote the same component or element.

Figure 9:
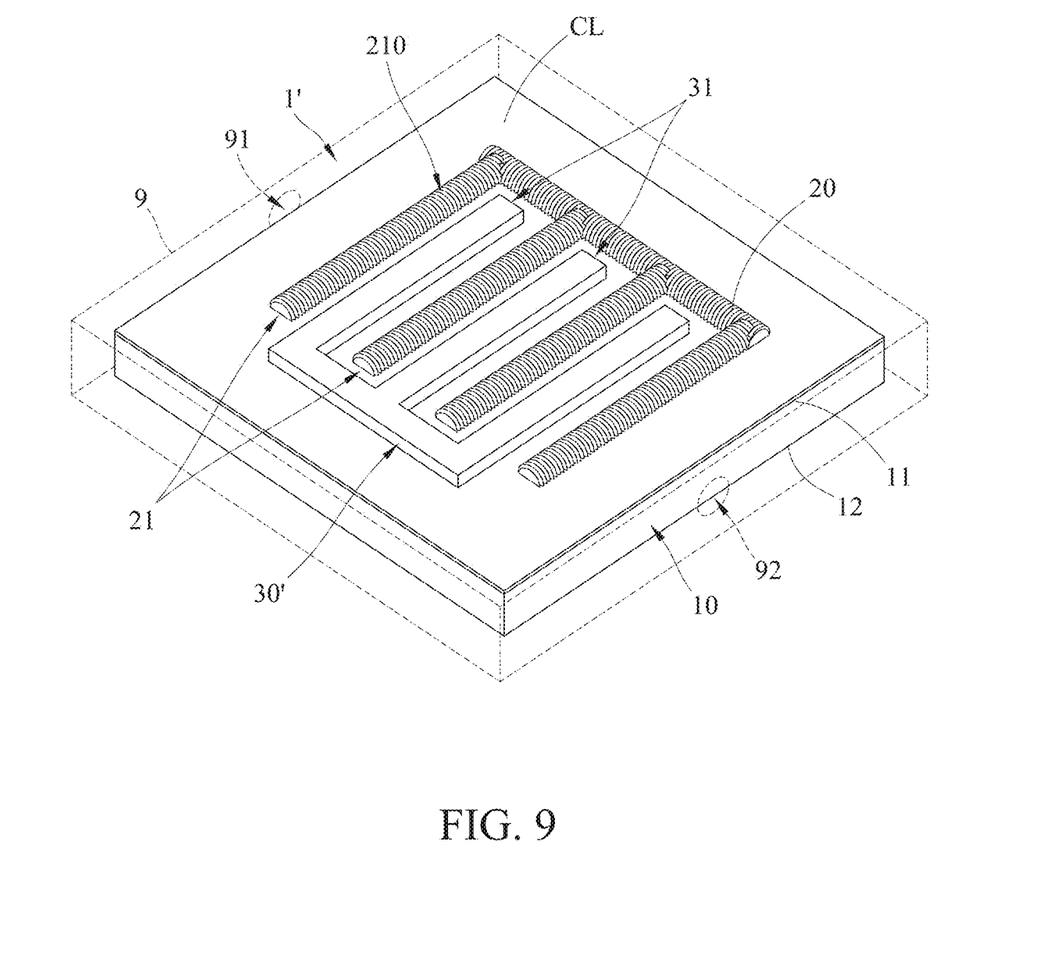
FIG. 9 is a perspective view of an ozone generator according to another embodiment of the disclosure.

For example, please refer to FIG. 9, another embodiment of the disclosure provides an ozone generator 1', the ozone generator 1' includes a second electrode 30' disposed on the first surface 11 of the dielectric substrate 10 and corresponding to the first electrode 20. The second electrode 30' has a configuration similar to the first electrode 20. Specifically, the second electrode 30' includes a plurality of second finger portions 31 spaced apart by each other by a suitable distance. The second finger portions 31 of the second electrode 30' and the first finger portions 21 of the first electrode 20 are alternately arranged, and the second finger portions 31 and the first finger portions 21 spaced apart by each other by a suitable distance. In this case, the first electrode 20 and the second electrode 30' together form a symmetrical surface discharge reactor on the same surface (i.e., the first surface 11) of the dielectric substrate 10. Optionally, there may be a conductive layer (not shown) arranged at the second surface 12 of the dielectric substrate 10 to be served as a ground layer.

Figure 10:
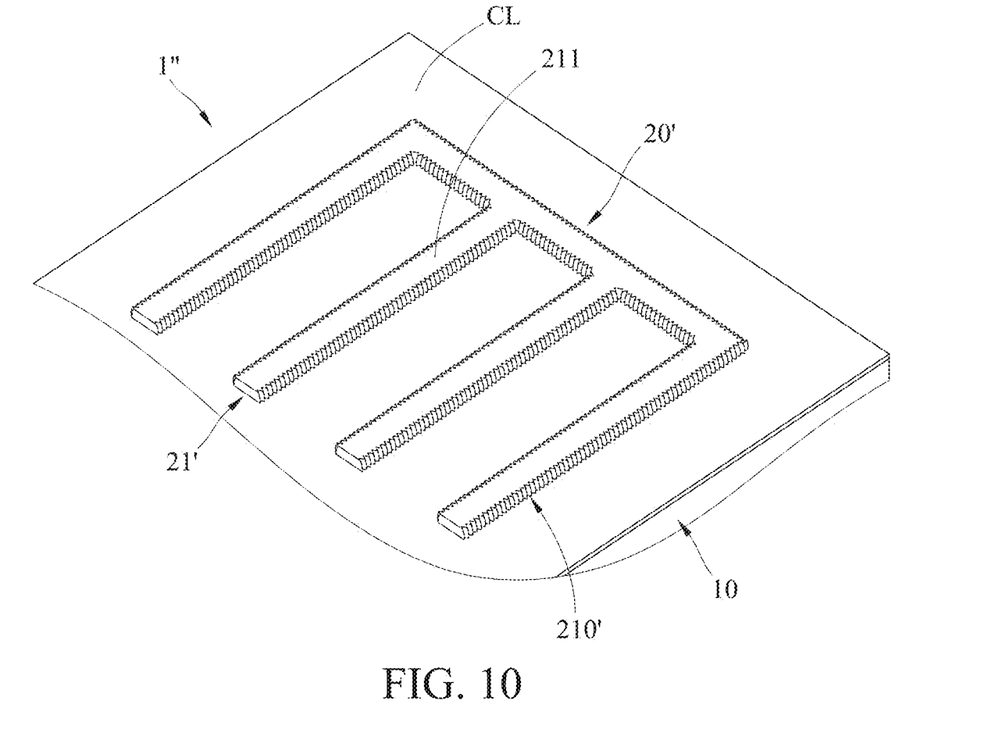
FIG. 10 is a perspective view of an ozone generator according to another embodiment of the disclosure.

Please see FIG. 10, another embodiment provides an ozone generator 1", the ozone generator 1" includes a first electrode 20', and a surface of the first electrode 20' located opposite to the dielectric substrate 10 is a flat surface (e.g., a flat surface 211 shown in FIG. 10). In this case, edges of superficial structure 210' of first finger portions 21' of the first electrode 20' which are in contact with the catalyst layer CL each have a zigzag contour.

Figure 11:
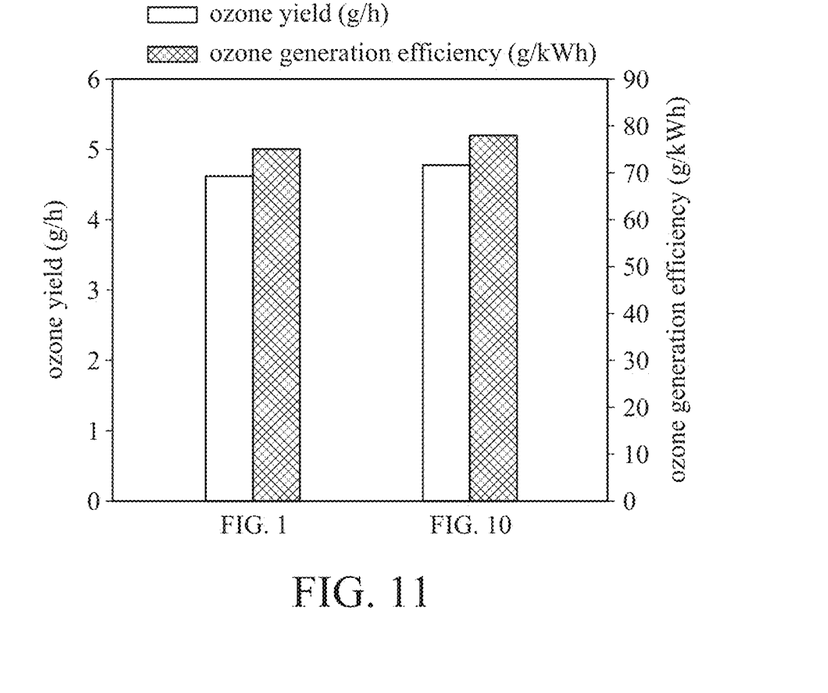
FIG. 11 shows ozone yield and ozone generation efficiency comparisons of the ozone generator in FIG. 1 and the ozone generator in FIG. 10 under the same conditions.

Then, please see FIG. 11, which shows ozone yield and ozone generation efficiency comparisons of the ozone generator 1 in FIG. 1 and the ozone generator 1" in FIG. 10 under the same conditions. As shown, the superficial structures 210' of the first electrode 20' also will induce point discharges to increase the interaction with the catalyst layer CL, thus the ozone generator 1" is able to achieve an ozone yield and an ozone generation efficiency similar to that generated by the ozone generator 1 in FIG. 1.

As discussed, as long as the superficial structures on the first electrode of the ozone generators of the disclosure have a profile or shapes that tapers outwards away from the first finger portions to induce point discharges, the superficial structures on the first electrode may be shaped as required.

According to the ozone generator and the ozone generating method as discussed in the above embodiments of the disclosure, the first electrode on the dielectric substrate enables surface dielectric barrier discharge, and the superficial structures on the first electrode are able to induce point discharges to improve the interaction with the catalyst, thus the plasma intensity near the first electrode is higher. This arrangement makes the ozone generator to be able to generate ozone under a relatively low operating voltage and lower power consumption while being able to improve the ozone generation efficiency.

Also, when the aforementioned arrangement interacts with a catalyst layer made of black titanium dioxide, the ozone yield and ozone generation efficiency will be significantly increased. In addition, the black titanium dioxide has an absorption peak in a wider wavelength range that covers ultraviolet light and visible light wavelengths, which makes the ozone generator available for air plasma and oxygen plasma and therefore is beneficial to significantly improve the ozone yield and ozone generation efficiency.

As such, the ozone generator and the ozone generating method for the ozone generator combine the advantages of surface dielectric barrier discharge, point discharges, and the usage of a catalyst having an absorption peak in a wide wavelength range and thus enabling a low power consumption and high energy efficiency ozone generation.

Further, the superficial structure increases the surface area for heat dissipation and therefore can increase the temperature of the first electrode so as to decrease the impact of high temperature on the ozone yield and ozone generation efficiency.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An ozone generator, comprising:
   a dielectric substrate;
   a first electrode disposed on a first surface of the dielectric substrate;
   a second electrode disposed on the dielectric substrate and corresponding to the first electrode; and
   wherein the first electrode comprises a plurality of first finger portions and a plurality of superficial structures integrally formed on the plurality of first finger portions; and
   wherein the first electrode has a flat surface at a side of the first electrode located opposite to the dielectric substrate, and the plurality of superficial structures are disposed only on side surfaces of the first electrode.

2. The ozone generator according to claim 1, wherein the second electrode is disposed on the first surface of the dielectric substrate.

3. The ozone generator according to claim 2, wherein the second electrode includes a plurality of second finger portions, and the plurality of first finger portions and the plurality of second finger portions are alternately arranged.

4. The ozone generator according to claim 1, further comprising a conductive layer disposed on a second surface opposite to the first surface and served as a ground layer.

5. The ozone generator according to claim 1, wherein the dielectric substrate has a second surface opposite to the first surface, and the second electrode is disposed on the second surface.

6. The ozone generator according to claim 5, further comprising a chamber body fixed to the second electrode, wherein the chamber body and the second electrode together enclose the dielectric substrate and the first electrode therein.

7. The ozone generator according to claim 6, wherein the plurality of first finger portions are located between a gas inlet and a gas outlet of the chamber body.

8. The ozone generator according to claim 5, wherein the second electrode comprises a plurality of fin structures extending outwards from a surface of the second electrode opposite to the first electrode.

9. The ozone generator according to claim 1, wherein each of the plurality of superficial structures is a thread.

10. The ozone generator according to claim 9, wherein the plurality of superficial structures have a thread pitch ranging between 1.2 millimeters and 3.7 millimeters.

11. The ozone generator according to claim 9, wherein the plurality of superficial structures form a plurality of air channels thereamong.

12. The ozone generator according to claim 1, further comprising a catalyst layer disposed on the first surface and in contact with the plurality of superficial structures.

13. The ozone generator according to claim 12, wherein at least part of the catalyst layer is located between the plurality of superficial structures and the first surface of the dielectric substrate.

14. The ozone generator according to claim 12, wherein the catalyst layer comprises a black titanium dioxide.

15. The ozone generator according to claim 14, wherein the black titanium dioxide has an absorption peak in a wavelength range ranging between 200 nanometers and 1000 nanometers.

16. The ozone generator according to claim 12, wherein edges of the plurality of superficial structures in contact with the catalyst layer each have a zigzag contour.

* * * * *